Jan. 5, 1960 G. F. SCHROEDER 2,919,585
WIRE-SUPPORTED GYRO WHEEL
Filed Aug. 17, 1959 5 Sheets-Sheet 5
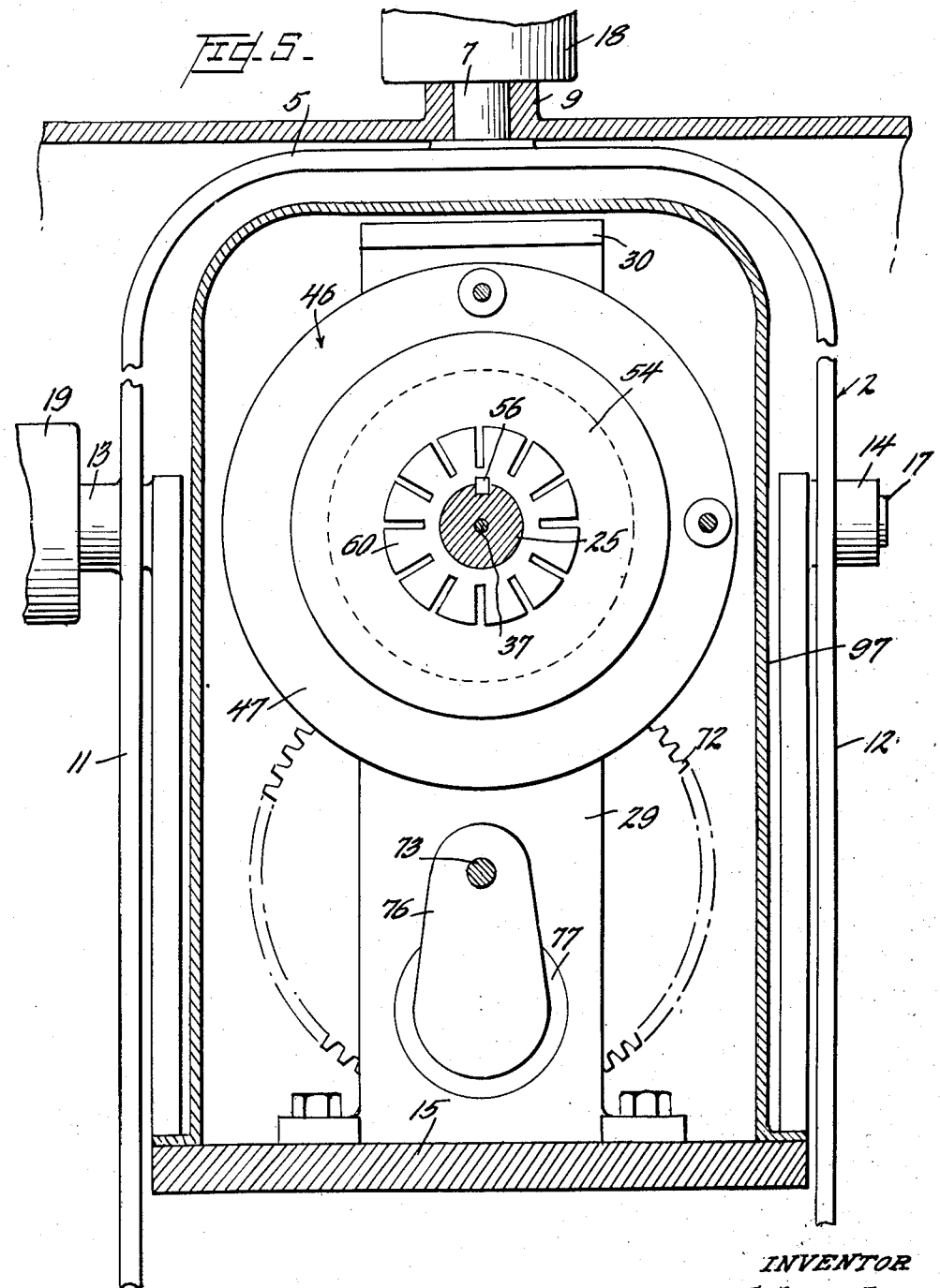
INVENTOR
G.F.Schroeder,
BY Borst & Borst
ATTORNEYS United States Patent Office 2,919,585
Patented Jan. 5, 1960

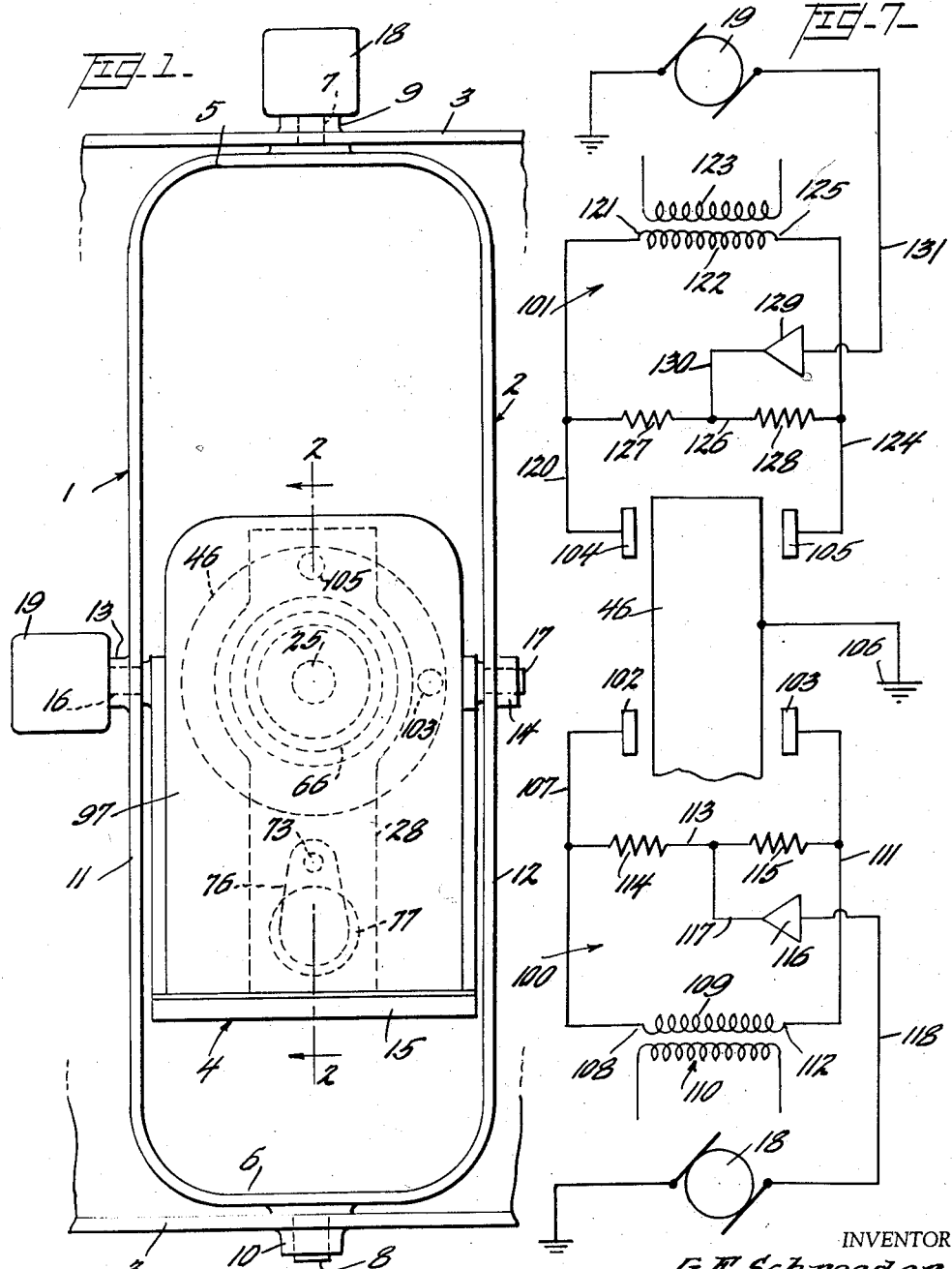

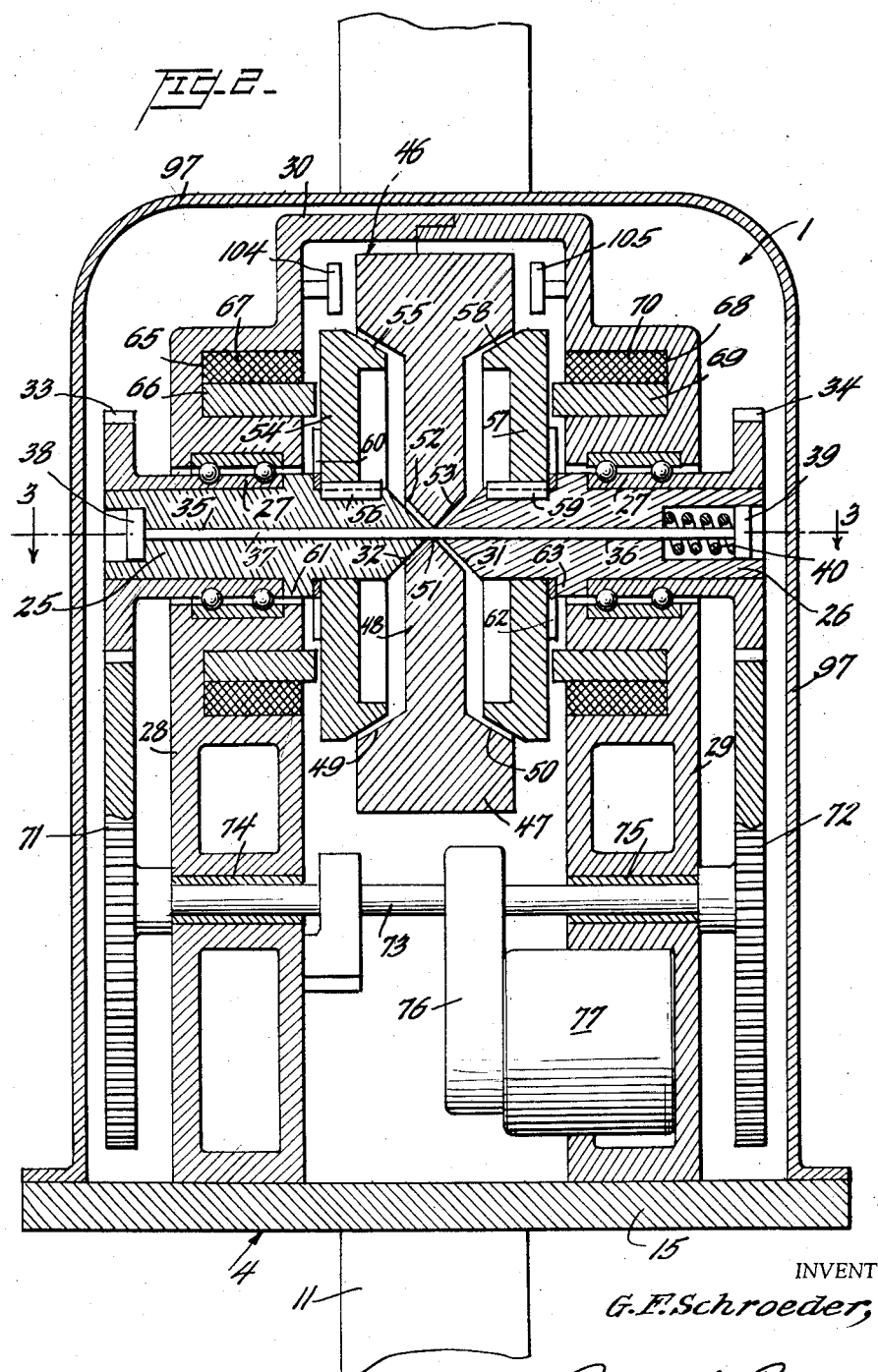

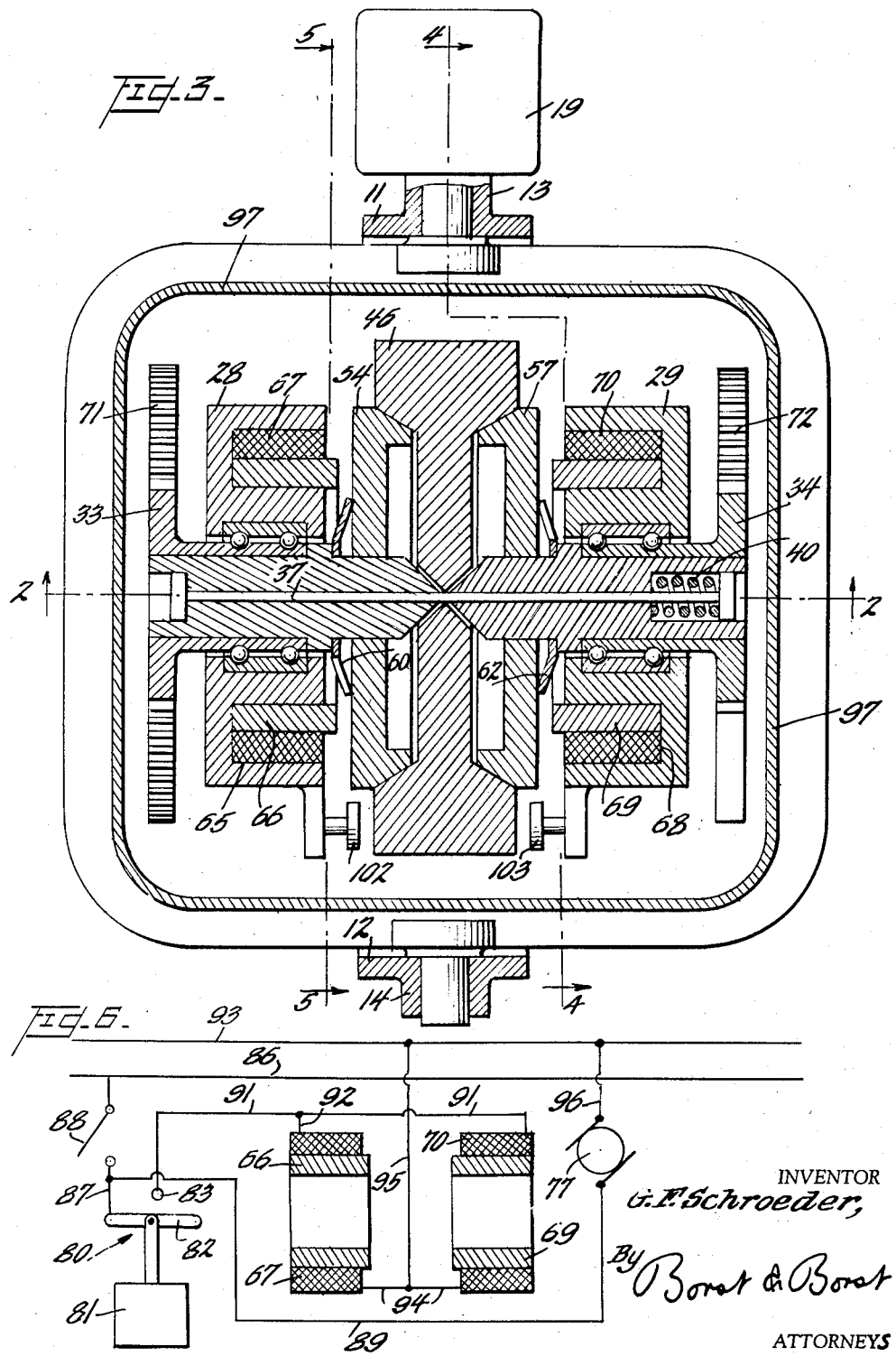

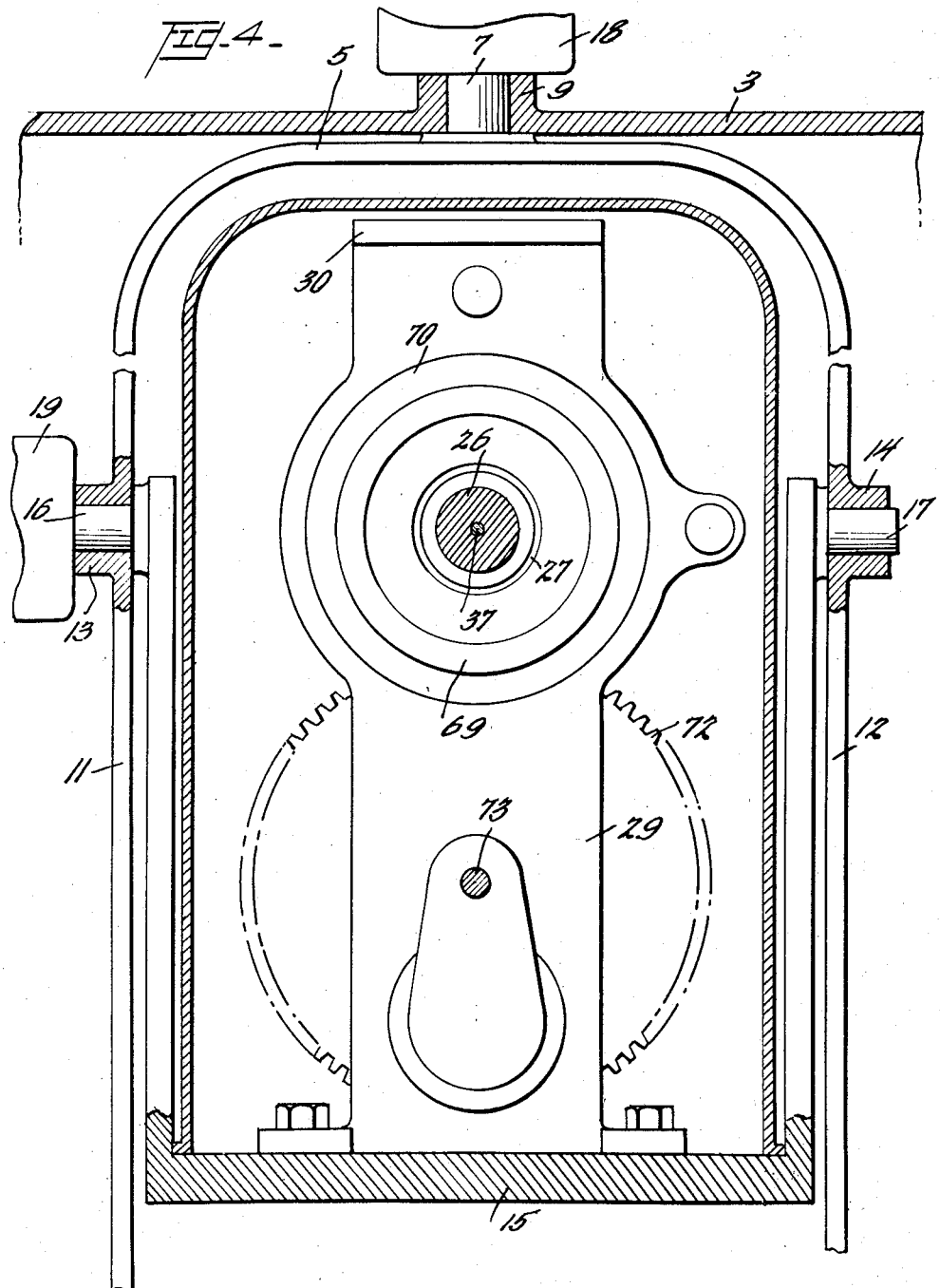

2,919,585

WIRE-SUPPORTED GYRO WHEEL

George F. Schroeder, West Pines Lake, N.J., assignor to Sperry Rand Corporation, Ford Instrument Company Division, Wilmington, Del., a corporation of Delaware Application August 17, 1959, Serial No. 834,253

15 Claims. (Cl. 74—5.7)

This invention relates generally to gyroscopes, and more specifically to the manner of rotatably mounting, driving, and controlling the operation of the gyro wheel. Heretofore in most gyros, the sensitive axis bearings are external to the motor bearings upon which the gyro wheel is rotatably mounted, with the nonhomogeneous motor elements mounted between the sensitive axis bearings. Heat, and various other factors, which cause mass shifts of these nonstable motor elements are normally the limiting factor in the design of superprecision gyros. According to my invention I provide a simple gyro wheel with no motor elements contained therein so that the gyro wheel only is rotated, and I so rotatably mount the wheel that the sensitive axis bearing is the only bearing in contact with the gyro wheel during normal operation. In this way mass shifts of the motor bearings and motor elements will not affect the gyro performance.

To this end I provide a pair of slightly spaced axially aligned high speed spindles, and I mount a short length of piano wire under tension which is carried by and extends from spindle to spindle axially thereof. The gyro wheel is provided with a knife-edge bearing and is clamped to the piano wire between the spindles for rotation therewith. To prevent excessive torsioned loading of the wire the gyro wheel, and driving mechanism therefor, are preferably mounted in a vacuum chamber. Suitable clutch mechanism which is operative to engage the gyro wheel and bring it up to speed is mounted upon the spindles. When the gyro wheel reaches operating speed, for example, 24,000 r.p.m., the clutch mechanism automatically disengages allowing the gyro wheel to be supported only by the piano wire. Due to the rotation of the gyro wheel in vacuum the only forces tending to slow the rotation of the gyro wheel are currents due to the earth's magnetic field. The wire and wheel will therefore rotate in unison with practically zero torsional loading. Deceleration of the wheel will be similarly accomplished through the clutch mechanism.

The construction is such that the wheel is supported on a minute elastic pivot-like mounting. Therefore a small deflection of the wheel with respect to the axis of the wire will produce only an exceedingly small elastic restraining force, most of which can be compensated for by electrostatic or magnetic counter forces. The resulting precessional oscillation due to this minute force causes a period of oscillation that is so long that a servo system which is provided to vary the axis of the wire to follow the wheel operates so fast that the minute spring-like torque does not produce any perceptible precession. Torques in the order of 3,000 dyne centimeters per degree are experienced due to the spring action on a .020 inch piano wire. The servo is capable of maintaining wheel and wire alignment to better than 3 minutes of arc, which allows a spring torque of approximately 150 dyne centimeters to exist. At least 90% of this is compensated for, giving a residual spring torque of approximately .06° per hour drift rate with a wheel whose angular momentum is 50 million $$\frac{gram\text{-}cm.^2}{sec.}$$

Since this force is elastically derived it will not produce a continuous precession, but a precessional oscillation with an extremely long period. Therefore, once the servo mechanism acts to eliminate the angular error between the wheel and the wire, even this force is materially reduced, if not brought to zero.

The high speed spindles, and the piano wire suspended therebetween are driven by an appropriate synchronous motor, and suitable pickoff means such as microsyn, capacitive, or optical sensors are provided to sense the movements of the wheel with respect to the wire spindle axis. The entire mechanism is mounted on gimbal means which is suitably servoed to be shifted in accordance with the output of the pickoff means. In normal operation, whenever an angle is imparted to the mounting of the gyro mechanism, the gyro wheel tends to stand still in inertial space which develops an angle with respect to the wire. This is sensed by the pickoff mechanism and the gimbal mechanism is then servoed to realign the wire with respect to the wheel. Torquing devices may be provided which act either magnetically or capacitively on the wheel to cause precession which is then followed by the servo mechanism.

The gyro wheel, the high speed spindles, and the clutch mechanism are all so constructed and arranged that the gyro wheel is constrained against linear movement in the event the supporting piano wire is severed or broken.

The principal object of the invention is to provide a gyroscope having new and improved means, for mounting, rotating and controlling the operation of the gyro wheel.

Another object of the invention is to provide a gyroscope of the aforesaid character in which a simple gyro wheel having no motor bearings or motor element incorporated therein is so mounted that the sensitive axis bearing is the only element in contact with the gyro wheel during normal operation.

Another object of the invention is to provide a gyroscope of the aforesaid character in which the gyro wheel supporting bearing consists of a single strand of high tensile strength piano wire which is axially suspended under tension between a pair of aligned high speed spindles for rotation therewith.

Another object of the invention is to provide in a gyroscope of the aforesaid character clutch means, carried by the high speed spindles, which is adapted to engage the gyro wheel during acceleration and deceleration thereof to prevent rotation thereof with respect to the supporting piano wire.

Still another object of the invention is to provide in a gyroscope of the aforesaid character means by which the gyro wheel is constrained against linear movement in the event the supporting piano wire is severed or broken.

Having stated the principal objects of the invention other and more limited objects of the invention will be apparent from the following specification and the accompanying drawings forming a part thereof in which:

Fig. 1 is a side elevation of a gyroscope embodying my invention;

Fig. 2 is an enlarged central vertical section the plane of which is indicated by the lines 2—2 on Figs. 1 and 3;

Fig. 3 is a horizontal section on the line 3—3 on Fig. 2;

Fig. 4 is a vertical section taken on the line 4—4 on Fig. 3;

Fig. 5 is a vertical section taken on the line 5—5 on Fig. 3;

Fig. 6 is a diagrammatic view illustrating the manner in which the rotation of the gyro wheel is controlled during normal operation, and during acceleration and deceleration thereof; and Fig. 7 is a diagrammatic view illustrating the manner in which the gyroscope gimbals are controlled in order to always maintain the axis of rotation of the gyro wheel perpendicular to the plane of rotation of the gyro wheel.

Referring now in detail to the drawings by reference characters, the numeral 1 indicates generally a gyroscope which is constructed according to my invention and includes an outer gimbal 2 which is rotatably mounted in fixed supporting means 3 for rotation about a vertical axis, and an inner gimbal 4 which is rotatably mounted in the outer gimbal 2 for rotation about a horizontal axis. The outer gimbal 2 consists of a rectangular open sided frame the upper and lower ends 5 and 6 which are provided with vertically aligned trunnions 7 and 8 which are disposed in bearings 9 and 10 carried by the supporting means 3, and the sides 11 and 12 of which are provided with horizontally aligned bearings 13 and 14. The inner gimbal 4 consists of a rectangular base plate 15 which is provided with horizontally aligned trunnions 16 and 17 which are disposed in the bearings 13 and 14, respectively, of the outer gimbal 2. The outer gimbal 2 is adapted to be rotated in either direction about its vertical axis by a servo motor 18 which is suitably connected to the trunnion 7, and the inner gimbal 4 is adapted to be rotated about its horizontal axis by a servo motor 19 which is suitably connected to the trunnion 16, as will be hereinafter explained.

A pair of similar horizontally aligned high speed spindles 25 and 26 are rotatably mounted, by means of anti-friction bearings 27, in a pair of spaced opposed supports 28 and 29 which are secured to the base plate 15 and extend upwardly therefrom, and are secured together at the upper ends thereof by connecting means 30. The opposed slightly spaced inner ends of the spindles 25 and 26 are conical as indicated at 31 and 32 and the outer ends thereof are provided with gears 33 and 34, respectively, through which they are rotated in unison at high speed. The spindles 25 and 26 are also provided with small aligned axial bores 35 and 36 in which a short length of high-strength piano wire 37 is mounted under tension by means of buttons 38 and 39, to which the ends of the piano wire 37 are attached, and a compression spring 40.

The gyro wheel 46 comprises a wide heavy rim 47 and a central web 48. The inner periphery of the rim 47 on each side of the web 48 is frusto-conical in shape as indicated at 49 and 50. The medial section of the web 48 is provided with an axial knife-edge aperture 51 having a conical surface 52 on one side thereof and a similar conical surface 53 on the other side thereof, which are complementary to the conical inner ends 32 and 33, respectively, of the spindles 25 and 26. The gyro wheel 46 is mounted upon the piano wire 37, which extends through the knife-edge aperture 51, between the opposed ends of the spindles 25 and 26 with the conical ends 32 and 33 of the spindles in close proximity to the conical sections 52 and 53 of the web 48 of the gyro wheel 46. By reference to Figs. 2 and 3 it will be seen that the knife-edge 51 is the only contact between the gyro wheel 46 and the supporting wire 37.

Clutch disk 54, slidably keyed on spindle 25 as indicated at 56, is provided with a frusto-conical surface 55 complementary to the frusto-conical 49 of the gyro wheel 46, between the support 28 and the opposed face of the gyro wheel 46; and the clutch disk 57, slidably keyed on spindle 26 as indicated at 59, is provided with a frusto-conical surface 58 complementary to the frusto-conical surface 50 of the gyro wheel 46, between the support 29 and the opposed face of the gyro wheel 46. A spring washer 60, which is disposed between the clutch disk 54 and a collar 61 on the spindle 25, yieldingly braces the clutch disk 54 into clutching engagement with the gyro wheel 46, as shown in Fig. 3; and a similar spring washer 62, which is disposed between the clutch disk 57 and a collar 63 on the spindle 26, yieldingly braces the clutch disk 57 into clutching engagement with the gyro wheel 46 also, as shown in Fig. 3.

The support 28 is provided with a cylindrical recess 65, concentric with the spindle 25, in which a cylindrical electromagnet 66 and its winding 67 are mounted, and the support 29 is provided with a cylindrical recess 68, concentric with the spindle 26 in which a similar electromagnet 69 and its winding 70 are mounted. The electromagnets 66 and 69 are operative, when energized, to hold the clutch disks 54 and 57 out of engagement with the gyro wheel 46, as shown in Fig. 2.

The spindles 25 and 26 are adapted to be rotated at high speed, in the order of 24,000 r.p.m., and with them the piano wire 37, the clutch disks 54 and 57, and the gyro wheel 46, through gears 71 and 72 secured to the opposite ends of a shaft 73 in mesh with the gears 33 and 34 respectively. The shaft 73, which is rotatably mounted in suitable bearings 74 and 75 carried by the supports 28 and 29, is adapted to be rotated, through a suitable driving connection 76, by a synchronous motor 77 which is mounted in the support 29.

During acceleration and deceleration of the gyro wheel 46 between zero and maximum r.p.m. it is essential that there be no relative rotation between the gyro wheel 46 and the supporting piano wire 37, as otherwise the knife-edge 51 would soon sever the piano wire. During rotation of the gyro wheel at the required operating speed there is no tendency for relative rotation between the gyro wheel 46 and the supporting wire 36, due to the inertia of the gyro wheel. During acceleration the spindles 25 and 26 and wire 37 tend to rotate at a much higher speed than the gyro wheel, and during deceleration the gyro wheel tends to rotate at a much higher speed than than the spindles and supporting wire. Therefore during acceleration and deceleration the clutch disks 54 and 57 are maintained in clutching engagement with the gyro wheel 46 as shown in Fig. 3, and during normal operation the clutch disks are maintained out of engagement with the gyro wheel as shown in Fig. 2. Also, in the event of power failure to the motor 77, or in the event the rotation of the gyro wheel slows down to a speed less than the rotation of the spindles and wire, the clutch disks 54 and 57 will immediately clutchingly engage the gyro wheel.

Various means may be utilized for accomplishing this result. One such means is shown in Fig. 6. As shown therein, a centrifugally actuated switch 80 is provided which is actuated through suitable means 81 by the shaft 73 in accordance with the speed of rotation thereof. The switch 80 comprises a pivoted switch arm 82, to which the actuating means 81 is connected, and a contact 83. The switch arm 82 is connected to the positive side 86 of a power line by a conductor 87, in which a master control switch 88 is interposed. The motor 77 is connected to the side 86 of the line by a conductor 89 which is connected to the conductor 87 beyond the switch 88, and the side 93 of the line by the conductor 96. The motor 77 will therefore be energized as long as the master switch 88 is closed. The contact 83 is connected to the electromagnet coil 70 by a conductor 91, and the electromagnet coil 67 is connected to the conductor 91 by a conductor 92. The coils 67 and 70 are connected to the negative side 93 of the line by conductors 94 and 95. During acceleration and deceleration the switch arm 82 is maintained out of engagement with the contact 83 by the centrifugal actuator 81. The master switch 88 being closed, current flows from the positive side 86 of the line through conductors 87 and 89 to the motor 77, and back to the other side 93 of the line through the conductor 96, in which case the motor 77 only is energized. The electromagnet coils 67 and 70 being deenergized, the spring washers 60 and 62 will force the clutch plates 54 and 57 into clamping engagement with opposite sides of the gyro wheel 46 so that the gyro wheel will be rotated in unison with the spindles 25 and 26 and the supporting wire 37.

After the gyro wheel has been brought up to the required speed the centrifugal actuator 81 shifts the switch arm into engagement with the contact 83. Current then also flows from the switch arm 82 through the contact 83 and conductors 91 and 92 to the coils 67 and 70, and back to the negative side of the line through the conductors 94 and 95, in which case both the motor 77 and the coils 67 and 70 are energized. The electromagnets 66 and 69 will therefore withdraw the clutch plates 54 and 57 from, and hold them out of engagement with the gyro wheel. The gyro wheel will then be rotated by and in unison with its supporting wire 37 since very little torque is required to maintain the gyro wheel rotating at a fixed speed after it has once been brought up to that speed. In order to reduce this to an absolute minimum I mount the gyro wheel and the supporting and driving means therefor in an evacuated housing 97 hermetically sealed to the base plate 15. Since the gyro wheel is being rotated in vacuum, the only forces tending to slow the rotation thereof are currents due to the earth's magnetic field.

The construction and arrangement of the gyro wheel, the spindles, and clutch plates are such that in the event of severance or breakage of the supporting wire 37 the gyro wheel will be constrained against flying movement due to the engagement of the conical surfaces 52 and 53 of the gyro wheel web 48 with the conical ends 32 and 33 of the spindles 25 and 26, and to the engagement of the conical surfaces 49 and 50 of the gyro wheel rim with the clutch plates 54 and 57.

Due to the knife-edge pivot-like mounting of the gyro wheel upon its supporting wire 37 the wheel may shift slightly out of perpendicularity to the axis of rotation of the spindles and supporting wire. In order to maintain the coincidence of the axis of rotation of the gyro wheel and the axis of rotation of the spindles and wire, I provide means responsive to the position of the gyro wheel by which the servomotors 18 and 19 are caused to rotate the gimbals 2 and 4 until the two axes of rotation are again in register. Various suitable pickoff means such as microsyn, capacitive, or optical sensors may be used for this purpose.

As shown herein I provide two pickoff mechanisms 100 and 101 of the capacitive type, one of which 100 is operative to control the operation of servomotor 18 to rotate the gimbal 4 in a direction to correct any variation between the two axes in a horizontal plant; and the other of which 101 is operative to control the operation of servomotor 19 to rotate the gimbal 2 in a direction to correct any variation between the two axes in vertical plane.

The pickoff mechanism 100 comprises a pair of opposed detector disks 102 and 103 which are carried by the supports 28 and 29 respectively, one on each side of the rim 47 of the gyro wheel horizontally outwardly of the center of the gyro wheel; and the pickoff mechanism 101 comprises a similar pair of opposed detector disks 104 and 105 which are carried by the supports 28 and 29 respectively, one on each side of the gyro wheel rim 47 vertically above the center of the gyro wheel 46. The disks 102 to 105 in combination with the gyro wheel, which is grounded as indicated at 106, each constitute a capacitor.

The disk 102 of the pickoff mechanism 100 is connected by a conductor 107 to one end 108 of the secondary winding 109 of a transformer 110, and the disk 103 thereof is connected by a conductor 111 to the opposite end 112 of the secondary winding 109. Between the disks 102 and 103 and the winding 109 the conductors 107 and 111 are connected together by a conductor 113 having resistances 114 and 115 interposed therein. Between the resistances 114 and 115 the conductor 113 is connected to an amplifier 116 by a conductor 117, and the amplifier 116 is connected by conductor means 118 to the servomotor 18 for the gimbal 2. Disks 102 and 103, and resistors 115 and 114 respectively, form an A.C. capacitive impedance bridge with the amplifier 116 being connected to the sensitive output thereof.

The disk 104 of the pickoff mechanism 101 is connected by a conductor 120 to one end 121 of the secondary winding 122 of a transformer 173, and the disk 105 thereof is connected by a conductor 124 to the other end 125 of the winding 122. Between the disks 104 and 105 and the winding 122 the conductors 120 and 124 are connected together by a conductor 126 having resistances 127 and 128 interposed therein. Between the resistances 127 and 128 the conductor 126 is connected to an amplifier 129 by a conductor 130, and the amplifier 129 is connected by conductor means 131 to the servomotor 19 for the gimbal 4. Disks 104 and 105, and resistors 127 and 128 respectively, form an A.C. capacitive impedance bridge with the amplifier 116 being connected to the sensitive output thereof.

During normal rotation of the gyro wheel 46, with the axis of rotation thereof coincident with the axis of the supporting wire 37 and the spindles 25 and 26, the gyro wheel 46 is centrally disposed between the disks 102 and 103 and the disks 104 and 105. By the proper choice of values for the resistors 114 and 115 of the impedance bridge the impedance bridge may be so balanced that a null will be produced and amplifier 116 will receive no signal when the gyro wheel is in its central position. If the gyro wheel shifts out of central position towards disk 102 the capacitance between disk 102 and the gyro wheel will be increased and the capacitance between disk 103 and the gyro wheel will be decreased. The variations in these capacitances will unbalance the impedance bridge thereby delivering to the amplifier 116 a signal which will be proportional to the amount of movement of the gyro wheel. The polarity of the signal will indicate the direction of wheel movement. This signal will be delivered to the servomotor 18 which will rotate the gimbal 2 in the proper direction until the gyro wheel is again in medial position between the disks 102 and 103. If the gyro wheel shifts out of medial position toward either of the disks 104 or 105 the pickoff mechanism 101 will effect actuation of the servomotor 19 in a like manner until the gyro wheel is again centered between the disks 104 and 105.

From the foregoing it will be apparent to those skilled in this art that I have provided a relatively simple and efficient mechanism for accomplishing the objects of the invention.

It is to be understood that I am not limited to the specific construction shown and described therein as various modifications may be made therein within the spirit of the invention and the scope of the appended claims.

What is claimed is:

1. A gyro mechanism of the character described comprising an outer gimbal, means rotatably supporting said outer gimbal for rotation about a fixed vertical axis, an inner gimbal rotatably supported by said outer gimbal for rotation about a horizontal axis, a pair of spaced opposed supports secured to said inner gimbal, a pair of spaced opposed axially aligned similar spindles rotatably mounted in said supports, a synchronous motor, means through which said spindles are rotated in unison with each other by said synchronous motor, an axially disposed piano wire carried by and extending between said spindles for rotation therewith, a gyro wheel mounted on said piano wire between said spindles for rotation thereby at operating speed, servo means by which said inner and outer gimbals are adapted to be rotated about their axes independently of each other, and pickoff means responsive to changes in position of said gyro wheel by which the operation of said servo means is controlled to maintain the axis of rotation of said gyro wheel coincident with the axis of rotation of said spindles and said piano wire.

2. A gyro mechanism as defined by claim 1 in which said gyro wheel is provided with an axial circular knife-edge bearing by which said gyro wheel is mounted upon said piano wire.

3. A gyro mechanism as defined by claim 2 in which said spindles and said gyro wheel are disposed within an evacuated housing.

4. A gyro mechanism as defined by claim 2 in which clamping means are provided by which said gyro wheel is releasably clamped to said spindles below operating speed, for rotation therewith.

5. A gyro mechanism as defined by claim 4 in which said clamping means is carried by said spindles and in which means is provided by which said clamping means is automatically brought into clamping engagement with said gyro wheel in the event of power failure to said motor.

6. A gyro mechanism as defined by claim 4 in which said clamping means is automatically held in clamping engagement with said gyro wheel during acceleration and deceleration of said gyro wheel and is automatically held out of clamping engagement with said gyro wheel when said gyro wheel is rotating at operating speed.

7. A gyro mechanism as defined by claim 6 in which spring means is provided by which said clamping means is held in clamping engagement with said gyro wheel, and in which electromagnetic means is provided by which said clamping means is held out of clamping engagement with said gyro wheel.

8. A gyro mechanism as defined by claim 2 in which said gyro wheel is provided with a pair of clutch surfaces, one on each face thereof and in which each of said spindles has a clutch disk slidably keyed thereon which is adapted to be spring pressed into engagement with the opposing clutch surface during acceleration and deceleration of said gyro wheel and to be electromagnetically held out of engagement with said opposing clutch surface during operating rotation of said gyro wheel.

9. A gyro mechanism of the character described comprising an outer gimbal, means rotatably suporting said outer gimbal for rotation about a fixed vertical axis, an inner gimbal rotatably supported by said outer gimbal for rotation about a horizontal axis, a pair of spaced opposed supports secured to said inner gimbal, a pair of spaced opposed axially aligned similar spindles rotatably mounted in said supports, a synchronous motor, means through which said spindles are rotated in unison with each other by said synchronous motor, an axially disposed piano wire carried by and extending between said spindles for rotation therewith, a gyro wheel having an axially disposed circular knife-edge defining an aperture through which said piano wire extends in contact with said knife-edge, said gyro wheel being provided with a pair of clutch surfaces, one on each side thereof, a clutch disk slidably keyed on each of said spindles for rotation therewith and adapted to be maintained in and out of engagement with an opposed clutch surface, spring means associated with each of said clutch disks by which said clutch disks are maintained in clutching engagement with said clutch surfaces during acceleration and deceleration of said gyro wheel, and an electromagnet associated with each of said clutch disks, said electromagnets when energized being operative to maintain said clutch disks out of engagement with said clutch surfaces during normal operating speed of said gyro wheel, servo means by which said inner and outer gimbals are adapted to be rotated about their axes independently of each other, and pickoff means responsive to changes in position of said gyro wheel by which the operation of said servo means is controlled to maintain the axis of rotation of said gyro wheel coincident with the axis of rotation of said spindles and said piano wire.

10. A gyro mechanism as defined by claim 9 in which each of said electromagnets comprises a cylindrical core and a winding therefor which are concentrically mounted in said supports about the axis of rotation of said spindles.

11. A gyro mechanism as defined by claim 10 in which means are provided by which said motor is energized during acceleration of said gyro wheel, by which said motor and said electromagnets are energized during normal operative rotation of said gyro wheel and by which neither the motor nor the electromagnets are energized during deceleration of said gyro wheel.

12. A gyro mechanism as defined by claim 11 in which said last mentioned means is responsive to the speed of rotation of said motor.

13. A gyro mechanism as defined by claim 12 in which said servo means includes a first pair of aligned detectors carried by said supports vertically above the axis of rotation of said spindle and said piano wire, one on each side of said gyro wheel, and a second pair of detectors carried by said supports, one on each side of said gyro wheel and angularly spaced 90° from said first pair of detectors.

14. A gyro mechanism as defined by claim 13 in which means are provided by which said motor is energized during acceleration of said gyro wheel, by which said motor and said electromagnets are energized during normal operative rotation of said gyro wheel and by which neither the motor nor the electromagnets are energized during deceleration of said gyro wheel.

15. A gyro mechanism as defined by claim 9 in which the web of said gyro wheel is provided with an upwardly and outwardly flaring conical surface on each side of said circular knife-edge, and in which the inner opposed ends of said spindles are provided with conical surfaces complementary to the aforesaid gyro wheel conical surfaces and are disposed in close proximity thereto.

References Cited in the file of this patent

UNITED STATES PATENTS 2,852,943    Sedgfield _____ Sept. 23, 1958

FOREIGN PATENTS 740,350    Great Britain _____ Nov. 9, 1955